United States Patent
Jeong et al.

(10) Patent No.: US 10,741,878 B2
(45) Date of Patent: Aug. 11, 2020

(54) NON-AQUEOUS ELECTROLYTE AND LITHIUM SECONDARY BATTERY INCLUDING THE SAME

(71) Applicant: LG Chem, Ltd., Seoul (KR)

(72) Inventors: Yu Ra Jeong, Daejeon (KR); Kyoung Ho Ahn, Daejeon (KR); Jeong Woo Oh, Daejeon (KR); Sol Ji Park, Daejeon (KR); Chul Haeng Lee, Daejeon (KR)

(73) Assignee: LG Chem, Ltd. (KR)

( * ) Notice: Subject to any disclaimer, the term of this patent is extended or adjusted under 35 U.S.C. 154(b) by 77 days.

(21) Appl. No.: 16/085,354

(22) PCT Filed: Dec. 4, 2017

(86) PCT No.: PCT/KR2017/014078
§ 371 (c)(1),
(2) Date: Sep. 14, 2018

(87) PCT Pub. No.: WO2018/105970
PCT Pub. Date: Jun. 14, 2018

(65) Prior Publication Data
US 2019/0074545 A1    Mar. 7, 2019

(30) Foreign Application Priority Data
Dec. 9, 2016   (KR) .................. 10-2016-0167892

(51) Int. Cl.
*H01M 10/0567* (2010.01)
*H01M 10/0525* (2010.01)
*H01M 10/0568* (2010.01)
*H01M 10/0569* (2010.01)

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0028* (2013.01)

(58) Field of Classification Search
CPC .................. H01M 10/0567; H01M 10/0568
See application file for complete search history.

(56) References Cited

U.S. PATENT DOCUMENTS

| | | | |
|---|---|---|---|
| 2006/0204856 | A1 | 9/2006 | Ryu et al. |
| 2007/0020529 | A1 | 1/2007 | Ryu et al. |
| 2011/0151317 | A1 | 6/2011 | Giroud et al. |
| 2011/0159379 | A1 | 6/2011 | Matsumoto et al. |
| 2013/0095378 | A1 | 4/2013 | Machida et al. |

(Continued)

FOREIGN PATENT DOCUMENTS

| | | | |
|---|---|---|---|
| CN | 102456922 | A | 5/2012 |
| CN | 102306838 | B | 4/2016 |

(Continued)

OTHER PUBLICATIONS

International Search Report for Application No. PCT/KR2017/014078 dated Mar. 9, 2018.

(Continued)

*Primary Examiner* — Matthew J Merkling
(74) *Attorney, Agent, or Firm* — Lerner, David, Littenberg, Krumholz & Mentlik, LLP

(57) ABSTRACT

The present invention relates to a non-aqueous electrolyte for lithium secondary battery, and more particularly, to a non-aqueous electrolyte including a lithium salt having a concentration of 4.1 M or more, an organic solvent, and a surfactant.

11 Claims, 1 Drawing Sheet

(56) References Cited

U.S. PATENT DOCUMENTS

| | | | |
|---|---|---|---|
| 2014/0106238 | A1 | 4/2014 | Giroud et al. |
| 2016/0308246 | A1 | 10/2016 | Swiatek |
| 2017/0229735 | A1 | 8/2017 | Ahn et al. |

FOREIGN PATENT DOCUMENTS

| | | | |
|---|---|---|---|
| JP | 4653032 | B2 | 3/2011 |
| JP | 5162803 | B2 | 3/2013 |
| JP | 5494116 | B2 | 5/2014 |
| JP | 2016139567 | A | 8/2016 |
| KR | 100327915 | B1 | 3/2002 |
| KR | 100813240 | B1 | 3/2008 |
| KR | 20100118064 | A | 11/2010 |
| KR | 20110038037 | A | 4/2011 |
| KR | 20110053456 | A | 5/2011 |
| KR | 20140051895 | A | 5/2014 |
| KR | 20150120393 | A | 10/2015 |
| KR | 20160040127 | A | 4/2016 |
| KR | 20160100958 | A | 8/2016 |
| WO | 2015092380 | A1 | 6/2015 |

OTHER PUBLICATIONS

Extended European Search Report including the Written Opinion for Application No. EP 17879026.7 dated Apr. 17, 2019.
Jiangfeng Qian et al: "High Rate and Stable Cycling of Lithium Metal Anode", Nature Communications, vol. 6, Feb. 20, 2015 (Feb. 20, 2015), p. 6362, XP055300626, DOI: 10.1038/NCOMMS7362, * p. 2, Last Par. *.
Jiangfeng Qiang et al: "Supplementary Information Supplementary Figures", Nature 2,Communications, Feb. 20, 2015 (Feb. 20, 2015), pp. 1-17, XP055577783, Retrieved From the Internet: URL:https://media.nature.com/original/nature-assets/ncomms/2015/150220/ncomms7362/ex tref /ncomms7362-s1.pdf [Retrieved on Apr. 4, 2019], * p. 14 *.

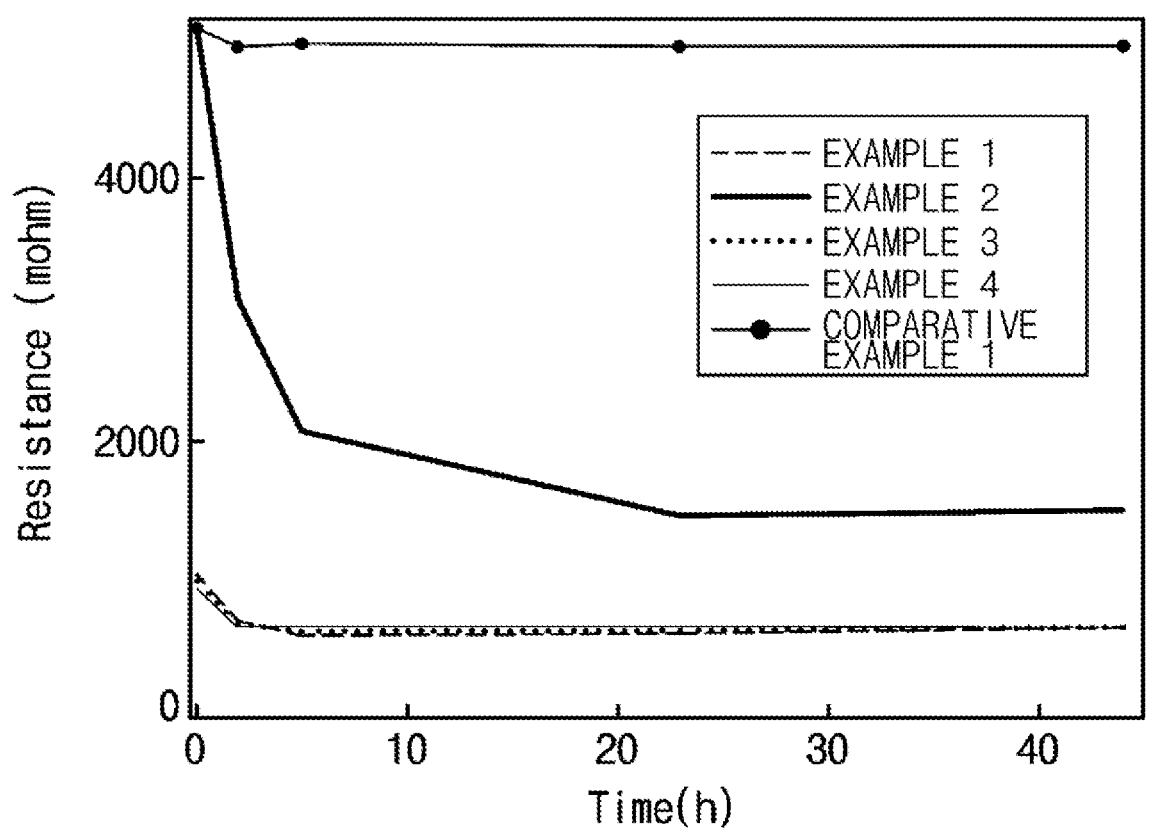

NON-AQUEOUS ELECTROLYTE AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2017/014078, filed on Dec. 4, 2017, which claims the benefit of Korean Patent Application No. 10-2016-0167892, filed on Dec. 9, 2016, the disclosures of which are incorporated herein by reference.

TECHNICAL FIELD

The present invention relates to a non-aqueous electrolyte and a lithium secondary battery including the non-aqueous electrolyte.

BACKGROUND ART

Demand for secondary batteries as an energy source has been significantly increased as technology development and demand with respect to mobile devices have increased. Accordingly, a great deal of research on batteries that can meet various needs is being carried out.

Particularly, demand for lithium secondary batteries, such as a lithium ion battery or a lithium ion polymer battery having merits of high energy density, high discharge voltage, output stability, or the like is high.

These lithium secondary batteries are charged and discharged while repeating a process of intercalation in which lithium ions are intercalated into a graphite electrode of a negative electrode from a lithium metal oxide of a positive electrode and deintercalation.

In such an electrolyte of lithium second battery, not only lithium ions but also negative ions are moved to form polarization in the battery.

Accordingly, research on a high-concentration electrolyte is being carried out such that when the high-concentration electrolyte having a higher transference number than electrolytes generally used nowadays is used, the battery performance can be improved due to the increase in the amount of ions present in the electrolyte and the accompanying increase in ion conductivity.

Regarding this, patent document 1 discloses a secondary battery electrolyte containing a high-concentration electrolytic salt having an electrolytic salt with a concentration of greater than 1.1 M, preferably, 1.3 M to 1.8 M.

However, since the electrolyte disclosed in patent document 1 above contains only an electrolytic salt with a concentration of greater than 1.1 M and equal to or smaller than 2 M, the increase in ion conductivity is limited, and when the concentration of the electrolytic salt is greater than 2 M, the increases in the viscosity and surface tension of the electrolyte become remarkable, so that the ion conductivity is decreased, and since the wettability of a separator is not good, there is a drawback in that the degradation of battery performance is concerned.

Thus, there are needs to manufacture a non-aqueous electrolyte, by which the improvement of battery performance can be expected by lowering the viscosity and the surface tension of the high-concentration electrolytic salt, and a secondary battery using the electrolyte.

PRIOR ART DOCUMENTS (Patent document 1) Korean Patent Application Laid-open Publication No. 10-2015-0120393

DISCLOSURE OF THE INVENTION

Technical Problem

To solve the aforementioned limitations, a first technical problem of the present invention is to provide a non-aqueous electrolyte which contains a high-concentration lithium salt, but has a low viscosity and a low surface tension, and thus has an excellent wettability of a separator.

In addition, a second technical problem of the present invention is to provide a secondary battery including the non-aqueous electrolyte.

Technical Solution

Specifically, according to an aspect of the present invention, there is provided a non-aqueous electrolyte including a lithium salt having a concentration of 4.1 M or more, an organic solvent, and a surfactant.

According to another aspect of the present invention, there is provided a lithium secondary battery including a positive electrode and a negative electrode, a separator interposed between the positive electrode and the negative electrode; and a non-aqueous electrolyte of the present invention.

Advantageous Effects

As described so far, a non-aqueous electrolyte including a high-concentration lithium salt of 4.1 M or more according to the present invention is capable of improving battery performance due to an increase in the amount of ions present in the electrolyte.

In addition, by containing a surfactant in the non-aqueous solution, the limitations due to increases in the viscosity and surface tension service which may occur when the high-concentration lithium salt is used, may be prevented in advance. Thus, a secondary battery with excellent performance may be manufactured.

BRIEF DESCRIPTION OF THE DRAWINGS

FIG. 1 is a comparison graph showing resistance values over time in lithium secondary batteries according to examples of the present invention and comparative examples.

BEST MODE FOR CARRYING OUT THE INVENTION

Hereinafter the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Specifically, according to an aspect of the present invention, there is provided a non-aqueous electrolyte including a lithium salt having a concentration of 4.1 M or more, an organic solvent, and a surfactant.

Although any lithium salt may be used without particular limitation provided that the lithium salt is generally used for electrolytes of secondary batteries, the lithium salt included in the non-aqueous solution according to the present invention may favorably include any one selected from the group consisting of lithium bis(fluoro sulfonyl) imide (LiFSI), lithium bis(trifluoro methane sulfonyl) imide (LiTFSI), and lithium hexafluoro phosphate (LiPF6). One kind of the lithium salt, or if necessary, a mixture of two or more kinds thereof may also be used.

In the non-aqueous electrolyte according to the present invention, the concentration of the lithium salt may be 4.1 M or more, favorably, 4.1 M to 6 M. Like the present invention, when a non-aqueous electrolyte including a high-concentration lithium salt of 4.1 M to 6 M is used, the non-aqueous electrolyte including the above concentration may achieve a high transference number and also achieve an effect of reducing diffusion resistance of lithium ions.

Organic solvents generally used in electrolytes of lithium secondary batteries may be used without limitation as the organic solvent included in the non-aqueous electrolyte according to the present invention. The organic solvents may include a nitrile-based solvent, an ester compound, an ether compound, or a carbonate compound, and may be used solely, or a mixture of two or more thereof may be used. For example, a mixture of a solvent with a high-dielectric constant and a solvent with a low boiling point may be used.

The nitrile-based solvent may be, but not limited to, acetonitrile, propionitrile, butyronitrile, valeronitrile, caprylonitrile, heptane nitrile, cyclopentane carbonitrile, cyclohexane carbonitrile, 2-fluorobenzonitrile, 4-fluorobenzonitrile, di fluorobenzonitrile, trifluorobenzonitrile, phenyl acetonitrile, 2-fluorophenyl acetonitrile, and 4-fluorophenyl acetonitrile, or a combination thereof. For example, when acetonitrile is used as the organic solvent, the acetonitrile has a high dielectric constant and a low viscosity and is therefore further suitable for a high-concentration lithium salt electrolyte. In addition, the acetonitrile has a high oxidative stability and may thus be applied to a high-voltage battery.

The carbonate compounds may be divided into cyclic carbonate compounds and linear carbonate compounds. The cyclic carbonate compounds include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof. In addition, the linear carbonate compounds include, for example, any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof.

In particular, among the carbonate compounds, it may be desirable to use the ethylene carbonate and the propylene carbonate, which are cyclic carbonate compounds, because the ethylene carbonate and the propylene carbonate are high-viscosity organic solvents, have high dielectric constants, and thus easily dissociate a lithium salt in the electrolyte. In addition, when a linear carbonate having low viscosity and low dielectric constant is used by being added to such a cyclic carbonate with an appropriate ratio, an electrolyte having a high electrical conductivity may be prepared, and thus may be more favorably used.

In addition, as the ether-based compound, any one selected from the group consisting of dimethyl ether, diethyl ether, dipropyl ether, methylethyl ether, methylpropyl ether, and ethylpropyl ether, or a mixture of two or more thereof may be used, but not limited thereto.

In addition, as the ester-based compound, any one selected from the group consisting of linear esters such as methyl acetate, ethyl acetate, propyl acetate, methyl propionate, ethyl propionate, propyl propionate, and butyl propionate; cyclic esters such as γ-butyrolactone, γ-valerolactone, γ-caprolactone, σ-valerolactone, and ε-caprolactone; dimethoxy ethane; diethoxy ethane; and fatty acid ester, or a mixture of two or more thereof may be used, but not limited thereto.

Meanwhile, the surfactant is used to reduce the viscosity and the surface tension of the high-concentration lithium salt, may be a fluorine-based surfactant, and specifically, includes a fluorine-based surfactant represented by formula 1 below.

[Formula 1]

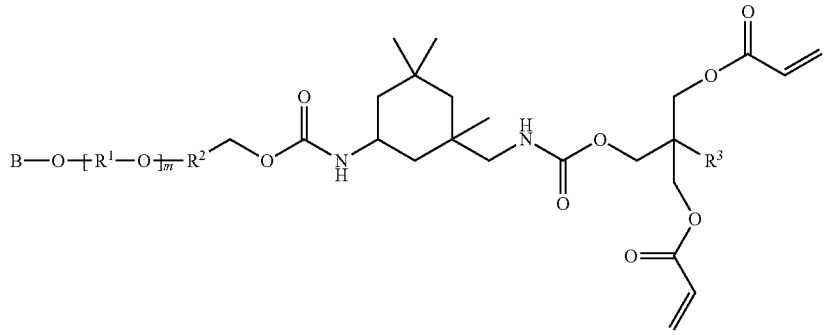

In Formula 1, B is Li, $CF_3$, or $CF_2CF_3$, $R^4$ and $R^2$ each are independently fluorine-substituted alkylene groups having 1 to 5 carbon atoms, m is 1 to 30, $R^3$ is an acrylate group or

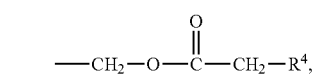

$R^4$ is an acrylate group, and the weight-average molecular weight of fluorine-based surfactant of Formula 1 above is 1,000 to 10,000.

The fluorine-based surfactant preferably includes a compound represented by Formulae 2 to 4 below.

[Formula 2]

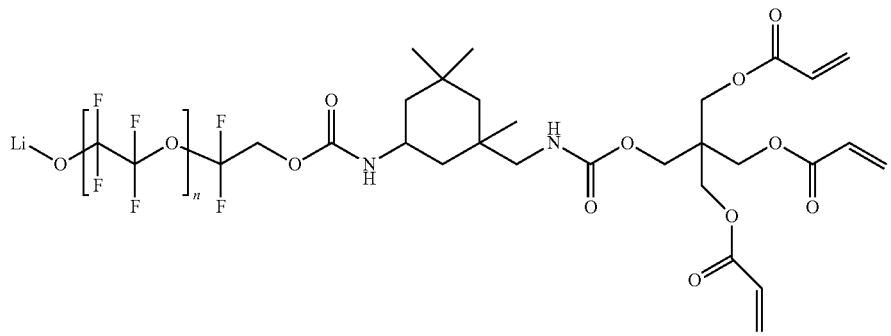

[Formula 3]

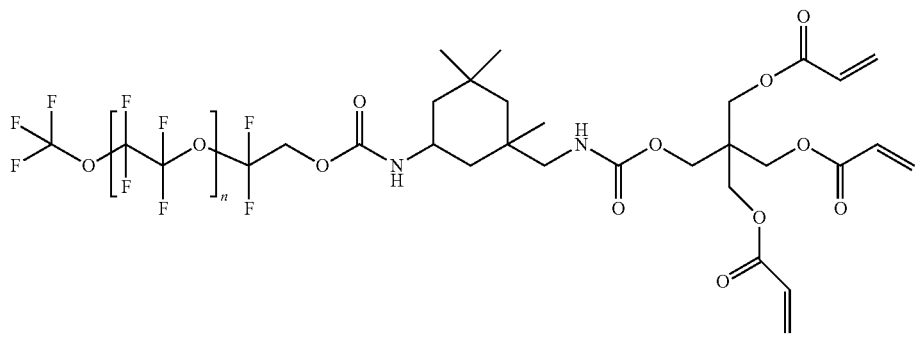

[Formula 4]

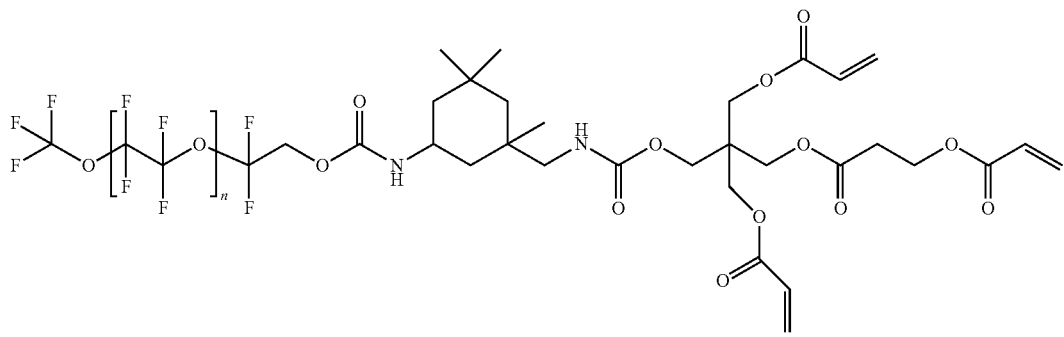

In each of Formulae 2 to 4, n is independently 1 to 30, and the weight-average molecular weight of the fluorine-based surfactant is 1,000 to 10,000.

The surfactant may further include, but not limited to, a hydrocarbon surfactant, silicone-based surfactant, a surfactant including a functional group in which a hydrophobic part having hydrophobicity has aromaticity, and a surfactant in which hydrophobic parts are respectively connected to both ends of a hydrophilic part having hydrophilicity.

The hydrocarbon surfactants may include, for example, polyoxyethylene alkyl ether, polyoxyethylene alkylphenyl ether, alkylpyrrolidone(1-octyl-2-pyrrolidone), alkyl glucoside, sorbitan fatty acid ester, monoamine fatty acid amide, diethanol amine fatty acid amide, adduct of alkylamine and polyoxyethylene, ethoxylated tetramethyldecynediol, glycerin fatty acid ester, pentaerythritol fatty acid ester, polyoxyethylene polyoxypropylene glycol, polyethylene glycol fatty acid ester, or fatty acid polyoxyethylene sorbitan, or a combination thereof.

The silicone-based surfactants may include, for example, dimethyl silicone, aminosilane, acryl silane, vinylbenzyl silane, glycidyl silane, mercapto silane, dimethyl silane, polydimethyl siloxane, polyalkoxy siloxane, hydrodiene modified siloxane, vinyl modified siloxane, amino modified siloxane, mercapto modified siloxane, fluorine modified siloxane, alkyl group modified siloxane, phenyl modified siloxane, or alkylene oxide modified siloxane, or a combination thereof.

The surfactant including a functional group in which a hydrophobic part having hydrophobicity has aromaticity, and the surfactant in which hydrophobic parts are respectively connected to both ends of a hydrophilic part having hydrophilicity may include a compound represented by Formula 5 below.

$$Y\text{-}[A]_a\text{-}[B]_b\text{-}[C]_c\text{-}(CH_2)_d\text{-}X$$ [Formula 5]

In Formula 5,

X is one (hetero)aryl group selected from the group consisting of phenyl and imidazolyl, Y is one (hetero)aryl group, hydrogen atom, or methoxy group selected from the group consisting of phenyl and imidazolyl, A, B, and C each are repeating units independently selected from the group consisting of oxyethylene group, oxypropylene group, oxybutylene group,

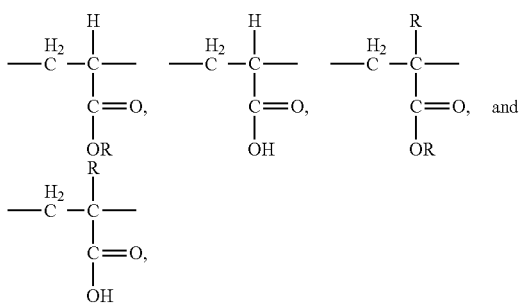

a, b, c and d are the numbers of repeating units,
wherein, a is 1 to 100,
b and c each are 0 to 100,
d is 0 to 5, and
R is an alkyl group.

In addition, the silicone-based surfactants may include compounds represented by Formula 6 below.

[Formula 6]

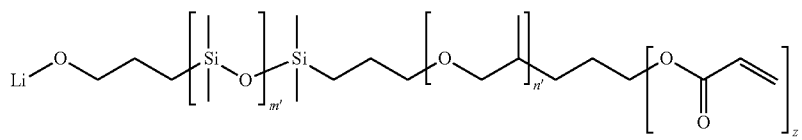

In Formula 6, m' and n' each are independently 1 to 20, z is 1 to 3, and the weight-average molecular weight is 1,000 to 10,000.

Meanwhile, in this specification, a weight-average molecular weight may mean a converted value of the standard polyethylene oxide as measured by gel permeation chromatography (GPC), and unless particularly specified otherwise, a molecular weight may mean a weight-average molecular weight. For example, in the present invention, the measurement is performed by using an Agilent series 4 under the GPC conditions, and in this case, the Ultrahydrogel linear X 2 column and 0.1M NaNO$_3$ (pH 7.0 phosphate buffer) effluent are used, and the measurement can be performed by injecting 100 μL of the effluent with a flow rate of 1.0 mL/min at 40° C.

The hydrocarbon surfactants and the silicone-based surfactants may be used sorely or a mixture of two or more thereof may be used.

The surfactant according to the present invention may be 10 wt % based on the total weight of the non-aqueous electrolyte and may favorably be included in an amount of 0.5 wt % to 2 wt %. When the content of the surfactants exceeds 10 wt %, the contents of effective substances that determines the battery performance are insufficient and thus, the charge/discharge characteristics may be degraded. In addition, when the content of the surfactants is less than 0.5 wt %, the surface tension and the viscosity of the non-aqueous electrolyte cannot be sufficiently lowered.

In addition, the non-aqueous electrolyte may further include an additive.

The additive may include, but not limited to, vinylene carbonate (VC), oxalyldifluoroborate (ODFB), vinyl ethylene carbonate (VEC), succinic anhydride (SA), succinonitrile (SN), 1,3-propane sultone (PS), or a combination thereof.

When a secondary battery is manufactured by adding the additive into the non-aqueous electrolyte, the additive together with the lithium salt forms a stable SEI film on a negative electrode and may thereby improve the output characteristics, suppress the decomposition of the surface of a positive electrode, and prevent an oxidation reaction of the electrolyte. Accordingly, the output characteristics of a secondary battery may be effectively improved. In addition, the additive suppresses Al corrosion and Cu damage and thus, the service life characteristics over cycles may be improved.

The additive may be included in an amount of 0.1 wt % to 10 wt %, favorably, 0.5 wt % to 3 wt % based on the total weight of the non-aqueous electrolyte. When the additive is included in an amount of less than 0.1 wt %, the effect of improving the low-temperature output characteristics and the high-temperature stability characteristics may be unsatisfactory, and when the content of the additive exceeds 10 wt %, a side reaction may excessively occur in the non-aqueous during charging and discharging of the secondary battery. In particular, when an excessive amount of the additive is added into the non-aqueous electrolyte, the additive may not sufficiently be decomposed and remain as an unreacted substance, and thus, the service life characteristics or resistance characteristics may be degraded.

Manufactured by adding the additive into the non-aqueous electrolyte, the lithium secondary battery according to the present invention may have improved output characteristics and form a stable SEI film on the surface of the negative electrode, effectively suppress the decomposition of the electrolyte, and finally, may have improved stability.

In addition, if necessary, the non-aqueous electrolyte according to the present invention may further include, but not limited to, a matrix polymer and ceramic powder. For example, in the non-aqueous electrolyte, a lithium salt, an organic solvent, and ceramic powder are impregnated into or supported by a matrix polymer. In this case, a leak phenomenon of the non-aqueous electrolyte may be effectively prevented due to a swelling phenomenon, gelation, or illiquidity of polymer compounds.

For example, the mixing ratio of the matrix polymer and the ceramic powder may be 1:1 to 1:6, favorably, 1:1 to 1:5 in mass ratio. For example, when the mixing ratio of the matrix polymer and the ceramic powder is less than 1:1, it is difficult to obtain an effect that can be obtained when adding the ceramic powder, and when the mixing ratio exceeds 1:6, battery characteristics such as cycle characteristics may be degraded.

The matrix polymer may include, but not limited to, at least one among the repeating units represented by Formulae 7 to 9 below.

[Formula 7]

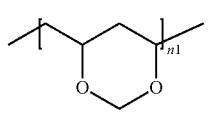

-continued

[Formula 8]

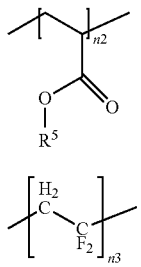

[Formula 9]

$$\left[\begin{array}{c} H_2 \\ C-C \\ F_2 \end{array}\right]_{n3}$$

In Formulae 7-9 above, n1, n2, and n3 each are independently 100 to 10,000, $R^5$ is $C_{n4}H_{2n4-1}O_{m1}$ (here, n4 is an integer of 1 to 8, and m1 is an integer of 0 to 4).

When n1, n2, and n3 are less than 100, gelation may not be sufficient, and when n1, n2, and n3 exceed 10,000, the viscosity increases and thus, the capacity of a secondary battery may be degraded.

For example, the matrix polymer may include polyvinylidene fluoride represented by Formula 9 above. At this point, the weight-average molecular weight of the polyvinylidene fluoride may be 550,000 or more. For example, when the weight-average molecular weight is less than 550,000, the cycle characteristics may be degraded.

The matrix polymer may be included in an amount of 0.1 wt % to 5 wt %, favorably, 1 wt % to 3 wt % based on the total weight of the non-aqueous electrolyte. For example, when the matrix polymer is included in an amount of less than 0.1 wt %, gelation is not sufficient, and thus, it is difficult to uniformly support the ceramic powder, and when the matrix polymer is included in an amount of greater than 5 wt %, battery characteristics may be affected such that energy density is decreased, and the like.

The ceramic powder may be used without particular limitation, and preferably, alumina, zirconium oxide, titanium oxide, silicon oxide, magnesium oxide, silicon carbide, boron nitride, or aluminum nitride may be sorely used, or a mixture of two or more thereof may be used. The ceramic powder is stably present in a battery, does not negatively affect a battery reaction, and also has a large volumetric thermal capacity, and may thus be suitable to be applied to a secondary battery.

The size of the ceramic powder may be 0.1 μm to 2.5 μm, and for example, when the size of the ceramic powder is less than 0.1 μm, the ceramic powder may not aggregate, and when the size of the ceramic powder is greater than 2.5 μm, a defective outer appearance may be caused.

In addition, it may be desirable that the particle size distribution of the ceramic be a Gaussian distribution, and accordingly, large particles and small particles are not massively mixed, and thus, productivity may be improved and the battery characteristics may be stabilized.

Meanwhile, a lithium secondary battery according to the present invention includes: a positive electrode and a negative electrode; a separator interposed between the positive electrode and the negative electrode; and a non-aqueous electrolyte.

The non-aqueous electrolyte is the same as described above, and thus, specific descriptions thereof will not be provided, and only the remaining configuration thereof will be described hereinafter in detail.

Specifically, the lithium secondary battery according to the present invention may be manufactured by injecting the non-aqueous electrolyte of the present invention into an electrode structure including a positive electrode, a negative electrode, a separator interposed between the positive electrode and the negative electrode. At this point, as the positive electrode, the negative electrode, and the separator which constitute the electrode assembly, all those generally used for manufacturing a lithium secondary battery may be used.

At this point, the positive electrode may be manufactured applying a positive electrode mixture including a positive electrode active material, a binder, a conductive agent, a solvent, and the like on to a positive electrode collector to coat the positive electrode collector.

The positive electrode collector may be any collector, provided that the collector does not cause a chemical change in the battery and has conductivity. For example, stainless steel, aluminum, nickel, titanium, calcined carbon, or aluminum or stainless steel with a surface treated with carbon, nickel, titanium, silver, or the like.

The positive electrode active material is a compound in which reversible intercalation and deintercalation of lithium can be performed, and specifically, may contain a lithium composite metal oxides including lithium and one or more metal such as cobalt, manganese, nickel or aluminum. More specifically, the lithium-metal composite oxide may be: a lithium-manganese-based oxide (e.g., $LiMnO_2$, $LiMn_2O_4$, etc.), a lithium-cobalt-based oxide (e.g., $LiCoO_2$ etc.), a lithium-nickel-based oxide (e.g., $LiNiO_2$ etc.), a lithium-nickel-manganese oxide (e.g., $LiNi_{1-Y}Mn_YO_2$ (where, 0<Y<1), $LiMn_{2-Z}Ni_ZO_4$ (where, 0<Z<2), etc.), a lithium-nickel-cobalt-based oxide (e.g., $LiNi_{1-Y1}Co_{Y1}O_2$ (where, 0<Y1<1), etc.), a lithium-manganese-cobalt-based oxide (e.g., $LiCo_{1-Y2}Mn_{Y2}O_2$ (where, 0<Y2<1), $LiMn_{2-Z1}Co_{Z1}O_4$ (where, 0<Z1<2), etc.), a lithium-nickel-manganese-cobalt-based oxide (e.g., $Li(Ni_pCo_qMn_{r1})O_2$ (where, 0<p<1, 0<q<1, 0<r1<1, p+q+r1=1), $Li(Ni_{p1}Co_{q1}Mn_{r2})O_4$ (where, 0<p1<2, 0<q1<2, 0<r2<2, p1+q1+r2=2), etc.), a lithium-nickel-cobalt-transition metal M oxide (e.g., $Li(Ni_{p2}Co_{q2}Mn_{r3}M_{s2})O_2$ (where, M is selected from the group consisting of Al, Fe, V, Cr, Ti, Ta, Mg and Mo, p2, q2, r3 and s2 are respectively atomic fractions of independent elements such that 0<p2<1, 0<q2<1, 0<r3<1, 0<s2<1, p2+q2+r3+s2=1), etc.), or the like, and any one thereof or a compound of one or more thereof may be included. Among these, in terms of capability of enhancing the capacity characteristics and stability, the lithium-metal composite oxide may be: $LiCoO_2$, $LiMnO_2$, a lithium-nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like), a lithium-nickel-cobalt-aluminum oxide (e.g., $LiNi_{0.8}Co_{0.15}Al_{0.05}O_2$ or the like), or the like. In addition, considering that a remarkable improvement effect may be achieved according to a control of the type and content of constituent elements constituting the lithium-metal composite oxide, the lithium-metal composite oxide may be: $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like, and any one thereof or a mixture of two or more thereof may be used.

The positive active material may be included in an amount of 80 wt % to 90 wt % based on the total weight of the positive electrode mixture.

The binder is a component which assists binding between the active material and a conductive agent or the like, and between the active material and the collector, and is generally added in an amount of 1 wt % to 30 wt % based on the total weight of the positive electrode mixture. For example, the binder may include poly vinylidene, poly vinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butylene rubber, fluoro rubber, or various copolymers.

The conductive agent is generally added in an amount of 1 wt % to 30 wt % based on the total weight of the positive electrode mixture.

The conductive agent may be any material, provided that the conductive agent does not cause a chemical change in the battery and has conductivity. For example, the conductive agent may include: graphite; a carbon-based material such as carbon black, acetylene black, Ketjen black, channel black, furnace black, lamp black, and thermal black; conductive fibers such as carbon fibers and metal fibers; metal powder such as carbon fluoride, aluminum, and nickel powder; conductive whisker such as zinc oxide and potassium titanate; conductive metal oxide such as titanium oxide; or conductive agent such as polyphenylene derivatives may be used. Specific examples of commercialized conductive agents include: acetylene black series of Chevron Chemical Company, Denka black (Denka Singapore Private Limited), products of Gulf Oil Company, Ketjenblack, EC series (products of Armak company), Vulcan XC-72 (products of Cabot company), Super P (products of Timcal Ltd.), and the like.

The solvent used to manufacture the positive electrode mixture may include an organic solvent, such as N-methyl-2-pyrrolidone (NMP), and the solvent may be used in an amount such that the solvent has a desirable viscosity when including the positive electrode active material and selectively including the binder, the conductive agent, and the like. For example, the positive electrode active material, the binder and the conductive agent may be included in the solid component so that the content of a solid component including the positive electrode active material, and selectively including the binder and the conductive agent reaches 50 wt % to 95%, preferably, 70 wt % to 90 wt %.

In addition, the negative electrode may be manufactured by including a metallic material such as a lithium metal or a lithium alloy, and a carbon material such as a low crystalline carbon, a high crystalline carbon, or by applying, on a negative electrode collector, a negative electrode mixture including a negative electrode active material, a binder, a conductive agent, a solvent and the like to coat the collector.

The negative electrode collector generally has a thickness of 3 μm to 500 μm. The negative electrode collector may include any material, provided that the collector does not cause a chemical change in the battery and has high conductivity. For example, copper, stainless steel, aluminum, nickel, titanium, calcined carbon, copper or stainless steel with a surface treated with carbon, nickel, titanium, or silver, or an aluminum-cadmium alloy may be used. Like the positive electrode collector, the negative electrode collector may also have an uneven surface to improve bonding strength of a negative electrode active material, and may be used in various forms such as a film, a sheet, a foil, a net, a porous body, a foam body, or a non-woven fabric body.

The negative electrode active material may be one or two or more negative electrode active materials selected from the group consisting of: natural graphite, artificial graphite, or a carbonaceous material; a lithium-containing titanium composite oxide (LTO), or metals (Me) such as Si, Sn, Li, Zn, Mg, Cd, Ce, Ni and Fe; alloys consisting of the metals (Me); an oxide of the metals (Me); and a composite of the metals (Me) and carbon.

The negative electrode active material may be included in an amount of 80 wt % to 99 wt % based on the total weight of the negative electrode mixture.

The binder is a component which assists binding between the active material and a conductive agent, and is generally added in an amount of 1 wt % to 30 wt % based on the total weight of the negative electrode mixture. For example, the binder may be poly vinylidene fluoride (PVDF), poly vinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene-butylene rubber, fluoro rubber, or various copolymers thereof.

The conductive agent is a component for further improving the conductivity of the negative electrode active material, and may be added in an amount of 1 wt % to 20 wt % based on the total weight of the negative electrode mixture. The conductive agent may be any material, provided that the conductive agent does not cause a chemical change in the battery and has conductivity. For example, graphite such as natural graphite and artificial graphite; carbon black such as acetylene black, Ketjen black, channel black, furnace black, lamp black, and thermal black; conductive fiber such as carbon fiber and metal fiber; metal powder such as carbon fluoride, aluminum, and nickel powder; conductive whisker such as zinc oxide and potassium titanate; conductive metal oxide such as titanium oxide; or polyphenylene derivatives.

The solvent used to manufacture the positive electrode mixture may include an organic solvent, such as N-methyl-2-pyrrolidone (NMP), and the solvent may be used in an amount such that the solvent has a desirable viscosity when including the positive electrode active material and selectively including the binder, the conductive agent, and the like. For example, the negative electrode active material, the binder and the conductive agent may be included in the solid component so that the content of a solid component including the negative electrode active material, and selectively including the binder and the conductive agent reaches 50 wt % to 95%, preferably, 70 wt % to 90 wt %.

As such a separation membrane, a porous polymer film, for example, a porous polymer film manufactured by using a polyolefin-based polymer, such as an ethylene homopolymer, a propylene homopolymer, an ethylene-butene copolymer, an ethylene-hexene copolymer, an ethylene-methacrylate copolymer, may be sorely used or a laminate thereof may be used. In addition, the separator may include a polyolefin-based or polyester-based resin separator substrate coated with a safety reinforced separator (SRS) prepared by applying ceramic particles and binder polymers. The ceramic particles may improve the thermal stability of the separator, and thus, may prevent the contraction of the separator at a high temperature. Meanwhile, the binder polymers fix the ceramic particles to the separator substrate. The SRS coating layer formed on the surface of the separator by the ceramic particles may have an air hole structure on the surface thereof. Even though the separator is coated with the ceramic particles, ions may smoothly move from a positive electrode to a negative electrode by air holes formed on the surface of the SRS coating layer. In addition, the binder polymers may also improve the mechanical stability of the separator by stably maintaining the ceramic particles, and may more stably attach the separator to the electrodes.

At this point, an organic/inorganic composite separator further coated with inorganic materials may be used to ensure the heat resistance or mechanical strength, and may selectively be used as a single layer or a multilayer.

The inorganic material may be used without particular limitation provided that the material can function to uniformly control the air holes of the organic/inorganic composite separator and improve heat resistance. For example, non-limitative examples of the inorganic material may include at least one selected from the group consisting of $SiO_2$, $Al_2O_3$, $TiO_2$, $BaTiO_3$, $Li_2O$, LiF, LiOH, $Li_3N$, BaO, $Na_2O$, $Li_2CO_3$, $CaCO_3$, $LiAlO_2$, $SrTiO_3$, $SnO_2$, $CeO_2$, MgO, NiO, CaO, ZnO, $ZrO_2$, SiC, a derivative thereof, and a mixture thereof.

The average diameter of the inorganic material may be 0.001 μm to 10 μm, and more specifically, 0.001 μm to 1 μm. When the average diameter of the inorganic material is within the above range, the dispersibility in a coating solution may be improved, and the problem occurrence in the coating process may be minimized. In addition, not only the physical properties of a final separator may be uniformized, but also inorganic particles are uniformly distributed in the air holes of a nonwoven fabric, may thereby improve the mechanical properties of the nonwoven fabric, and thus, there is a merit in that the sizes of the air holes of the organic/inorganic composite separator may be easily adjusted.

The average diameter of the air holes of the organic/inorganic composite separator may be within a range of 0.001 μm to 10 μm, and more specifically, 0.001 μm to 1 μm. When the average diameter of the air holes of the organic/inorganic composite separator is within the above range, not only the gas permeability and the ion conductivity may be controlled within a desired range, but also the possibility of inner shorts of the battery caused by the contact of a positive electrode and a negative electrode may be removed when the battery is manufacture by using the organic/inorganic composite separator.

The porosity of the organic/inorganic composite separator may be within a range of 30 vol % to 90 vol %. When the porosity is within the above range, ion conductivity increases, and mechanical strength may become excellent.

In addition, a general porous nonwoven fabric, for example, a high-melting-point glass fiber, polyethylene terephthalate fibers, or the like may be used, but not limited thereto.

The outer shape of the lithium secondary battery according to the present invention may be, but not limited to, a cylindrical shape using a can, a square shape, a pouch shape, a coin shape, or the like.

MODE FOR CARRYING OUT THE INVENTION

Hereinafter an exemplary embodiment will be described in detail to specifically describe the present invention. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

EXAMPLE

Example 1

[Preparation of Non-Aqueous Electrolyte]

A non-aqueous electrolyte was prepared by dissolving LiFSI into an acetonitrile organic solvent in a concentration of 4.5 M, and adding a fluorine-based surfactant represented by Formula 10 below in an amount of 0.5 wt % based on the total weight of the resultant.

[Formula 10]

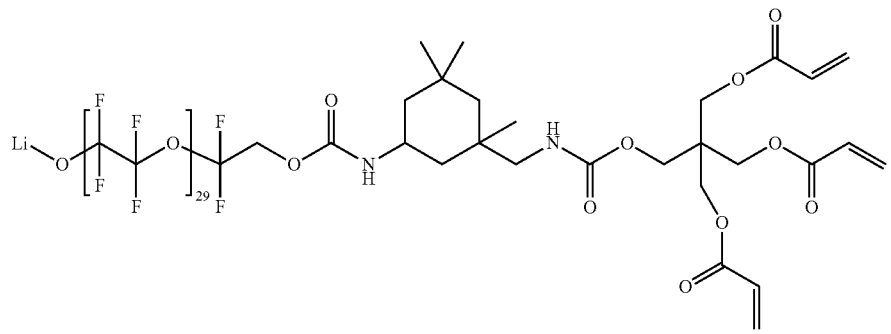

[Manufacture of Positive Electrode]

A positive electrode mixture was prepared by adding, based on 100 parts by weight of N-methyl-2-pyrollidone (NMP) which is a solvent, 40 parts by weight of positive electrode mixture in which: lithium-cobalt composite oxide ($LiCO_2$) as positive electrode active material particles; carbon black as a conductive agent; and polyvinylidene fluoride (PVDF) as a binder were mixed with a ratio of 90:5:5 (wt %). The positive electrode mixture was applied onto a positive electrode collector (Al thin film) having a thickness of 100 μm, dried, and processed by a roll press, thereby manufacturing a positive electrode.

[Manufacture of Negative Electrode]

A negative electrode mixture was prepared by adding, based on 100 parts by weight of N-methyl-2-pyrollidone (NMP) which is a solvent, 80 parts by weight of negative electrode mixture in which natural graphite as a negative electrode active material; PVDF as a binder; and carbon black as a conductive agent were mixed with a ratio of 95:2:3 (wt %). The negative electrode mixture was applied onto a negative electrode collector (Cu thin film) having a thickness of 90 μm, dried, and processed by a roll press, thereby manufacturing a negative electrode.

[Manufacture of Secondary Battery]

A con-type cell was manufactured through a general method by using the positive electrode and the negative electrode manufactured by the above-mentioned method together with an organic/inorganic composite separator, and then, the prepared non-aqueous electrolyte was injected into the coin-type cell to manufacture a lithium secondary battery.

Example 2

A non-aqueous electrolyte and a secondary battery including the same were prepared through the same method as that in Example 1 except that LiFSI was dissolved in a concentration of 5.5 M in the preparation of the non-aqueous electrolyte.

Example 3

A non-aqueous electrolyte and a secondary battery including the same were prepared through the same method as that in Example 1 except that 1 wt % of fluorine-based surfactant was added in the preparation of the non-aqueous electrolyte.

Example 4

A non-aqueous electrolyte and a secondary battery including the same were prepared through the same method as that in Example 1 except that 0.5 wt % of fluorine-based surfactant and 0.5 wt % of silicone-based surfactant represented by Formula 11 below were added as surfactants.

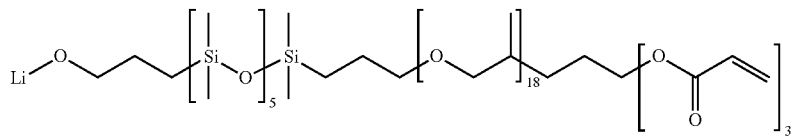

COMPARATIVE EXAMPLE

Comparative Example 1

A non-aqueous electrolyte and a secondary battery including the same were prepared through the same method as that in Example 1 except that a surfactant was not added.

EXPERIMENTAL EXAMPLE

Experimental Example 1: Measurement of Surface Tension

Regarding the secondary batteries manufactured in Examples 1 to 4 and Comparative Example 1, respective measured values of the surface tension at 25° C. are shown in Table 1 below.

Specifically, regarding the non-aqueous electrolytes prepared in Examples 1 to 4 and Comparative Example 1, the surface tension at 25° C. were measured by using a ring method for obtaining surface tension in a process of measuring a force required to separate a ring from an interface. Specifically, the surface tension of the non-aqueous electrolytes prepared in Examples 1 to 4 and Comparative Example 1 were measured in such a way that the non-aqueous electrolytes prepared in Examples 1 to 4 and Comparative Example 1 were raised until contacting a surface of the ring, and then, the non-aqueous electrolytes were lowered to extend a liquid film generated under the ring.

TABLE 1

| | Lithium ion | | Surfactant | | |
| --- | --- | --- | --- | --- | --- |
| | Kind | Concentration (M) | Kind | Content (wt %) | Surface tension (mN/m) |
| Example 1 | LiFSI | 4.5 | F-based | 0.5 | 20.7 (24.8° C.) |
| Example 2 | LIFSI | 5.5 | F-based | 0.5 | 21.6 (25.2° C.) |
| Example 3 | LiFSI | 4.5 | F-based | 1 | 20.5 (24.9° C.) |
| Example 4 | LiFSI | 4.5 | Si-based + F-based | 0.5 + 0.5 | 20.4 (25.0° C.) |
| Comparative Example 1 | LiFSI | 4.5 | — | — | 41.2 (27.4° C.) |

As shown in Table 1, it could be found that in the secondary batteries according to Examples 1 to 4 according to the present invention, the surface tension is remarkably lower than in the secondary battery prepared in Comparative Example 1. It was understood that the surface tension of the non-aqueous electrolyte was decreased due to the surfactants included in the non-aqueous electrolyte of the secondary batteries according to Examples 1 to 4 above. Thus, it was understood that the limitation, in which when a high-concentration electrolyte was used, the wettability of a separator was degraded, could be solved.

Experimental Example 2: Wettability Experiment

Wettability was checked through resistance values of the secondary batteries prepared in Examples 1 to 4 of the present invention and Comparative Example 1. Specifically, the non-aqueous electrolytes prepared in Examples 1 to 4 and Comparative Example 1 above were injected into a coin-type cell, and as illustrated in FIG. 1, 1 kHz resistance over time was measured. When the wettability is not sufficient, a large resistance appears, and when the wettability is sufficient, the resistance converges to a constant resistance value.

As illustrated in FIG. 1, the secondary batteries prepared in Examples 1 to 4 exhibited a remarkably lower resistance value than the secondary battery prepared in Comparative Example 1. Thus, it was understood that the wettability of the separator was sufficient.

The invention claimed is:
1. A non-aqueous electrolyte comprising:
a lithium salt having a concentration of 4.1 M or more;
an organic solvent; and
a surfactant, wherein the surfactant is a fluorine-based surfactant represented by Formula 1 below:

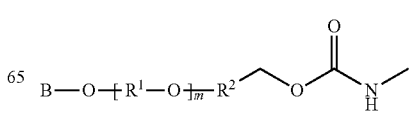

-continued

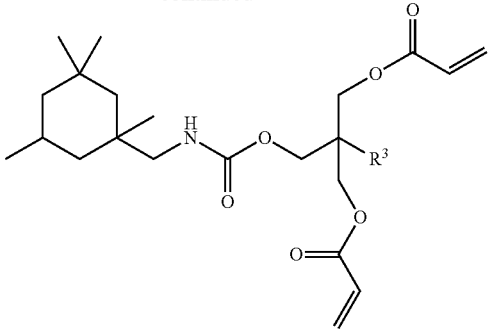

in Formula 1,
B is Li, $CF_3$, or $CF_2CF_3$;
$R^1$ and $R^2$ each are independently fluorine-substituted alkylene groups having 1 to 5 carbon atoms;
$R^3$ is an acrylate group or

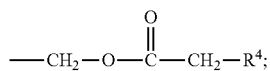

$R^4$ is an acrylate group; and
m is 1 to 100.

2. The non-aqueous electrolyte of claim 1, wherein the concentration of the lithium salt is 4.1 M to 6 M.

3. The non-aqueous electrolyte of claim 1, wherein the lithium salt comprises any one or more selected from the group consisting of lithium bis fluoro sulfonyl imide, lithium bis trifluoro methane sulfonyl imide, and lithium hexafluoro phosphate, or a mixture of two or more thereof.

4. The non-aqueous electrolyte of claim 1, wherein the organic solvent comprises a nitrile-based solvent, an ester, an ether, a carbonate, or a combination thereof.

5. The non-aqueous electrolyte of claim 1, wherein the surfactant further comprises:
   a hydrocarbon surfactant;
   a silicone-based surfactant;
   a surfactant comprising a functional group in which a hydrophobic part having hydrophobicity has aromaticity; and
   a surfactant in which hydrophobic parts are respectively connected to both ends of a hydrophilic part having hydrophilicity.

6. The non-aqueous electrolyte of claim 1, wherein the surfactant is added in an amount of 0.5 wt % to 10 wt % based on the total weight of the non-aqueous electrolyte.

7. The non-aqueous electrolyte of claim 1 further comprising an additive.

8. The non-aqueous electrolyte of claim 7, wherein the additive comprises vinylene carbonate, oxalyldifluoroborate, vinyl ethylene carbonate, succinic anhydride, succino nitrile, 1,3-propane sultone, or a combination thereof.

9. The non-aqueous electrolyte of claim 7, wherein the additive is added in an amount of 0.1 wt % to 10 wt % based on the total weight of the non-aqueous electrolyte.

10. The non-aqueous electrolyte of claim 1, further comprising a matrix polymer and ceramic powder.

11. A lithium secondary battery comprising:
    a positive electrode;
    a negative electrode;
    a separator interposed between the positive electrode and the negative electrode; and
    the non-aqueous electrolyte of claim 1.

* * * * *